No. 807,526. PATENTED DEC. 19, 1905.
J. D. WILLIAMSON.
FERTILIZER DISTRIBUTER.
APPLICATION FILED OCT. 23, 1905.
2 SHEETS—SHEET 1.
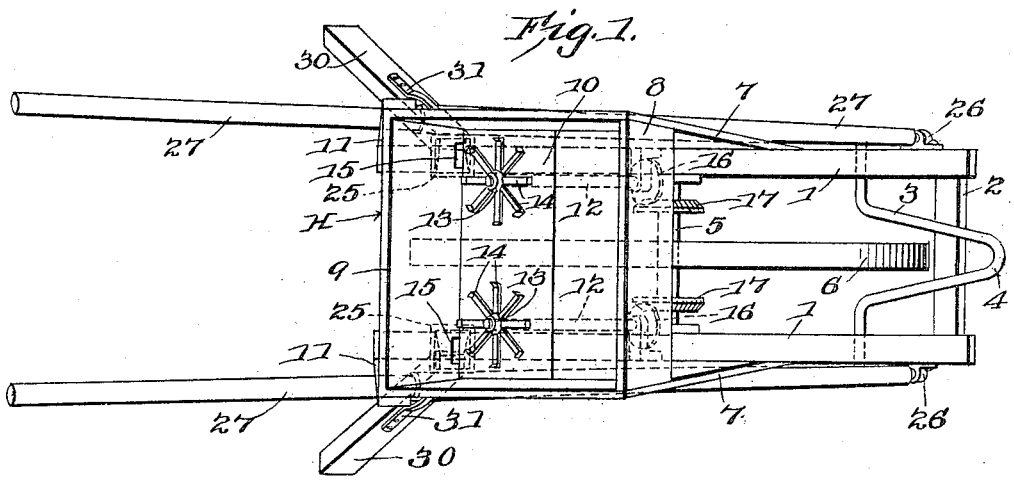
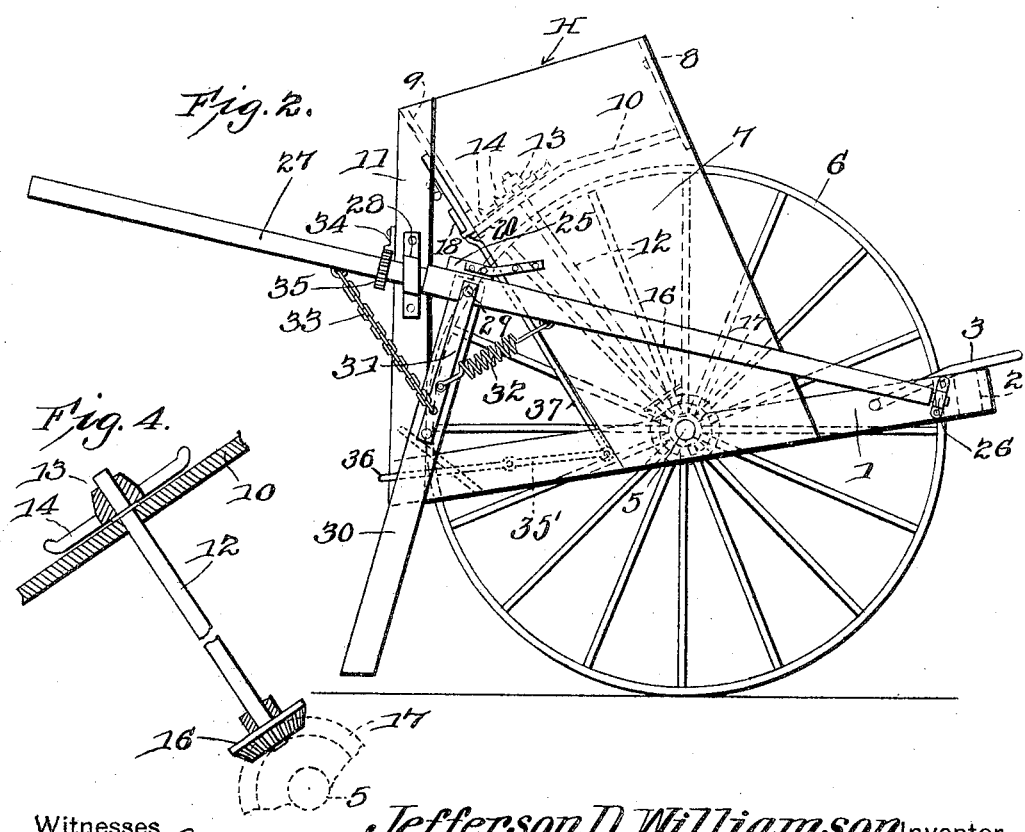
Witnesses
Jefferson D. Williamson, Inventor.
by C. A. Snow & Co.
Attorneys

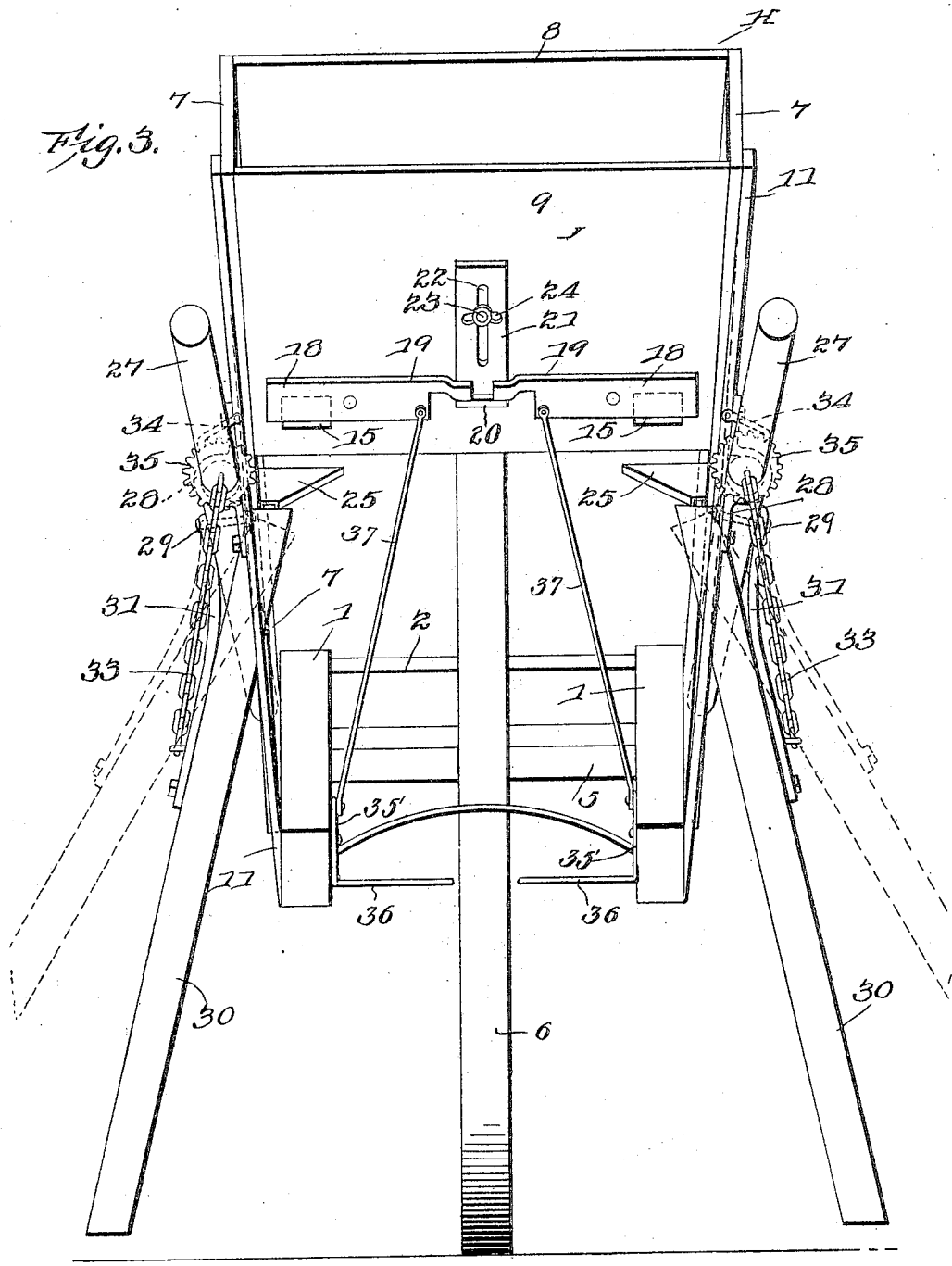

UNITED STATES PATENT OFFICE.

JEFFERSON D. WILLIAMSON, OF CHARLOTTE, NORTH CAROLINA.

FERTILIZER-DISTRIBUTER.

No. 807,526.　　　　Specification of Letters Patent.　　Patented Dec. 19, 1905.

Application filed October 23, 1905. Serial No. 284,028.

*To all whom it may concern:*

Be it known that I, JEFFERSON D. WILLIAMSON, a citizen of the United States, residing at Charlotte, in the county of Mecklenburg and State of North Carolina, have invented a new and useful Fertilizer-Distributer, of which the following is a specification.

This invention relates to fertilizer-distributers; and the principal objects of the invention are to simplify and improve the construction and operation of this class of devices.

Other objects are to provide means for distributing fertilizing material from a single hopper to parallel rows at various distances apart, to provide improved means for controlling the fertilizer conveying or distributing tubes by the handles of the machine, and to provide improved means for connecting said tubes or conveyers with the handles.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of the invention, it being, however, understood that no limitation is necessarily made to the precise structural details therein exhibited, but that changes, alterations, and modifications within the scope of the invention may be resorted to when desired.

In the drawings, Figure 1 is a top plan view of a fertilizer-distributer constructed in accordance with the principles of the invention. Fig. 2 is a side elevation, partly in section, of the improved machine. Fig. 3 is a rear elevation, and Fig. 4 is a sectional detail view of the stirring and feeding mechanism.

Corresponding parts in the several figures are indicated throughout by similar characters of reference.

The frame of the improved machine is composed of side members 1 1, connected near their front ends by a cross-piece 2, near which the draft member 3, including a loop 4, is pivotally mounted. The side members 1 1 have bearings for the shaft or axle 5, carrying the transporting-wheel 6, which is located about centrally between the side members of the frame. The latter supports the side pieces 7 of the hopper H, which latter is provided with front and rear walls 8 and 9 and with an angular bottom 10, the transporting-wheel being accommodated between the side members 7 7 beneath the bottom of the hopper. The side members of the hopper are inclined rearwardly and are connected with the rear ends of the side members of the frame by means of upright braces 11.

Bearings are provided in the bottom of the hopper and upon the side members of the frame for a pair of shafts 12 12, the upper ends of which extend into the hopper and carry the stirring or agitating wheels 13, each of which is provided with a plurality of radially-extending fingers 14, whereby the contents of the hopper will be loosened and agitated and carried in the direction of the exit openings or slots 15 in the rear wall 9 of the hopper. The shafts 12 are driven by bevel-pinions 16 at their lower ends meshing with bevel-gears 17 upon the shaft or axle of the transporting-wheel, which latter receives rotary motion by contact with the ground.

For the purpose of regulating the escape of material through the slots 15 the rear wall of the hopper is provided with closures or cut-offs 18, pivoted exteriorly upon said rear wall and having inwardly-extending lateral arms 19, adapted to engage a flange 20, formed at the lower edge of a vertically-movable regulating-slide 21, having a slot 22 engaging a bolt or supporting member 23, having a thumb-nut 24, whereby said slide may be retained securely at various adjustments. Pivoted upon the inner side of the side members of the frame are levers 35′, the rear ends of which have curved terminals forming foot-pieces 36, while the front ends of said levers are connected by link-rods 37 with the cut-offs 18, which may be thus conveniently adjusted by the operator, who walks behind the machine, without necessity of letting go of the handles. The regulating-slide 21 is previously adjusted, so as to permit the cut-offs to be opened to the desired extent, the flange at the lower edge of the slide serving to prevent the cut-offs from being opened too wide. To close the cut-offs, the foot-levers are operated, as described.

The side members of the frame are provided near their front ends with lugs 26, affording bearings for the front ends of handles 27, which are additionally supported in bearings 28 upon the uprights 11. Connected with the handles, as by means of pivotal members 29, are the conveyer-tubes 30, which are reinforced by straps 31. The upper ends of the tubes 30 are so disposed as to be always in registry with the discharge ends of the funnels 25. Said tubes are also connected with the handles 27 by means of springs 32 and flexible connections, such as chains 33, the latter being connected with the handles in rear and the former in front of the pivots 29. By this construction it will be seen that if the tubes 30 should encounter any obstructions they will be capable of yielding and passing over such obstructions without injury to any part of the machine.

It will be seen that by turning the handles 27 in their respective bearings the free ends of the conveyer-tubes 30 may be moved upwardly and outwardly, thus spacing their discharge ends at various distances apart. Means, such as pawls and ratchets 34 35, may be provided for the purpose of retaining the handles and the conveying-tubes at various adjustments.

In operation the improved machine is guided by the handles 27 and motion is transmitted from the transporting-wheel to the agitating-wheels within the hopper, the rear portion of the bottom of which is rearwardly inclined, so that the contents of said hopper will be readily discharged through the slots 15, the regulating-slide 21 having been previously adjusted by the means herein described to regulate the extent to which the cut-offs 18 may be opened, thereby regulating the quantity of material discharged. The material discharged from the hopper drops into the funnels 25 and is thereby discharged into the upper end of the conducting-tubes 30, the lower ends of which have been adjusted by turning the handles 27 at any desired distance apart, thus depositing the fertilizing material in spaced rows, or, if desired, in furrows previously prepared for its reception.

Having thus described the invention, what is claimed is—

1. In a fertilizer-distributer, a frame, an axle supported for rotation within the frame, a single transporting-wheel upon said axle, a hopper having side members supported upon the frame at opposite sides of the wheel said hopper having an angular bottom, shafts supported for rotation and having agitating-wheels disposed above the rear portion of the bottom, means for transmitting motion to said shafts from the axle, cut-offs pivoted upon the rear wall of the hopper to regulate slots in said rear wall, and means for adjusting the cut-offs and for retaining them at various adjustments.

2. In a fertilizer-distributer, a hopper having slots in the rear wall thereof, means for expelling the contents of the hopper through said slots, funnels beneath the slots, pivotally-supported handles, and tubular ducts supported by said handles with their upper ends beneath the funnels.

3. In a fertilizer-distributer, a hopper, a pair of pivotally-supported handles, tubular ducts connected with said handles, and means for conveying the contents of the hopper to the tubular ducts.

4. A hopper, a pair of pivotally-supported rods constituting handles, tubular ducts connected with said handles, and means for conveying the contents of the hopper to said ducts.

5. A hopper, a pair of pivotally-supported members constituting handles, tubular ducts connected pivotally with said handles, and means for conveying the contents of the hopper to said ducts.

6. A hopper, a pair of pivotally-supported members constituting handles, tubular ducts connected pivotally with said handles, flexible means connecting the ducts with the handles to restrain the movement of the free ends of said ducts in a forward direction, spring means connecting the ducts with the handles to permit the free ends of said ducts to yield in a rearward direction, and means for conveying the contents of the hopper to the ducts.

7. The combination with a hopper, of a rockshaft supported for oscillation and constituting a handle, a tubular duct connected pivotally and yieldably with the handle, and means for conveying the contents of the hopper to said duct.

8. The combination with a hopper, of a rockshaft supported for oscillation and constituting a handle, a tubular duct carried by said handle, and means for conveying the contents of the hopper to said duct.

9. The combination with a hopper, of a rockshaft supported for oscillation and constituting a handle, a tubular duct carried by said handle, means for conveying the contents of the hopper to the duct said means including a funnel supported beneath the hopper adjacent to the upper end of the duct, and means for regulating the passage of material from the hopper to the funnel.

10. In a fertilizer-distributer, a hopper having openings in the rear wall thereof for the passage of material, cut-offs pivoted adjacent to said openings and having laterally-extending arms, a slide provided with a flange disposed in the path of said arms, means for securing the slide at various adjustments, suitably-supported foot-levers, and links connecting said levers with the cut-offs.

In testimony that I claim the foregoing as my own I have hereto affixed my signature in the presence of two witnesses.

JEFFERSON D. WILLIAMSON.

Witnesses:
C. H. DULS,
J. E. CARSON.